United States Patent
Barbieri et al.

(10) Patent No.: US 10,372,759 B2
(45) Date of Patent: *Aug. 6, 2019

(54) PROFILE BASED CONTENT RETRIEVAL FOR RECOMMENDER SYSTEMS

(71) Applicant: FUNKE DIGITAL TV GUIDE GmbH, Berlin (DE)

(72) Inventors: Mauro Barbieri, Eindhoven (NL); Serverius Petrus Paulus Pronk, Vught (NL); Jan Korst, Eindhoven (NL)

(73) Assignee: Funke Digital TV Guide GmbH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/274,190

(22) Filed: Sep. 23, 2016

(65) Prior Publication Data
US 2017/0075994 A1 Mar. 16, 2017

Related U.S. Application Data

(63) Continuation of application No. 13/704,496, filed as application No. PCT/EP2011/059885 on Jun. 15, 2011, now Pat. No. 9,477,783.

(30) Foreign Application Priority Data

Jun. 15, 2010 (EP) .................................... 10165989

(51) Int. Cl.
*G06F 16/78* (2019.01)
*G06F 16/903* (2019.01)
*G06F 16/2453* (2019.01)
*G06F 16/2455* (2019.01)
*G06F 16/9535* (2019.01)
(Continued)

(52) U.S. Cl.
CPC .......... *G06F 16/78* (2019.01); *G06F 16/2453* (2019.01); *G06F 16/2455* (2019.01); *G06F 16/90335* (2019.01); *G06F 16/9535* (2019.01)

(58) Field of Classification Search
CPC ..................... G06F 17/30864; G06F 17/30554
(Continued)

(56) References Cited

U.S. PATENT DOCUMENTS 6,353,810 B1  3/2002  Petrushin
7,937,725 B1  5/2011  Schaffer et al.
(Continued)

FOREIGN PATENT DOCUMENTS

JP  2005 196415 A  7/2005
JP  2007282042  10/2007

OTHER PUBLICATIONS

N.J. Davies, et al; "Networked Information Management;" BT Technology Journal; vol. 15, No. 2; Apr. 1, 1997; pp. 194-208, Abstract, Figure 2.
(Continued)

*Primary Examiner* — Jean B Fleuranrtin
(74) *Attorney, Agent, or Firm* — Ware, Fressola, Maguire & Barber LLP

(57) ABSTRACT

The present invention relates to an apparatus, a method and a computer program product for controlling a recommender system, wherein a user profile normally used by a recommender to predict user ratings is employed to generate a targeted query for the remote database yielding a set of results that can be scored by the recommender and provided as suggestions to the user.

12 Claims, 2 Drawing Sheets

(51) Int. Cl.
*G06F 7/00* (2006.01)
*G06F 17/00* (2019.01)

(58) Field of Classification Search
USPC .............. 707/602, 713, 722, 733, 734, 784
See application file for complete search history.

(56) References Cited

U.S. PATENT DOCUMENTS

| | | | |
|---|---|---|---|
| 9,477,783 B2* | 10/2016 | Barbieri | .................. G06F 16/78 |
| 2003/0066067 A1* | 4/2003 | Gutta | .................. G06F 16/9535 725/9 |
| 2003/0066068 A1 | 4/2003 | Gutta et al. | |
| 2008/0104127 A1* | 5/2008 | Billmaier | .............. G06F 16/435 |

OTHER PUBLICATIONS

Francesco Ricci, et al; "Acquiring and Revising Preferences in a Critique-Based Mobile Recommender System;" IEEE Intelligent Systems; vol. 22, No. 3; May 1, 2007; pp. 22-29, Figures 1-3.

Mark Maybury, et al; "Personalcasting: Tailored Broadcast News;" User Modeling and User-Adapted Interaction, Kluwer Academic Publishers; vol. 14, No. 1; Feb. 1, 2004; pp. 119-144, Abstract, Figures 3, 4, 7-9.

T. Takagi, et al; "Conceptual matching and its applications to selection of TV programs and BGMs;" Systems, Man, and Cybernetics, 1999. IEEE SMC'99 Conference Proceedings; vol. 3; Oct. 12, 1999; pp. 269-273, whole document.

K. Kira, et al; "The feature selection problem: traditional methods and a new algorithm;" Proceedings, 10th National Conference on Artificial Intelligence; Menlo Park, CA; Jul. 12, 1992; pp. 129-134, whole document.

W-S Li, et al; "Facilitating complex Web queries through visual user interfaces and query relaxation;" Computer Networks and ISDN Systems, North Holland Publishing, Amsterdam, NL; vol. 30, No. 1-7; Apr. 1, 1998; pp. 149-159, Abstract, Figure 4.

Tao Xiaoyan, "Research on classification method based on support vector machine and manifold learning"; published by Wanfang database; Nov. 6, 2008; all pages.

K. Kira, et al; "A practical approach to feature selection"; Proc. 9th Int. Conf. Cach. Lear. 1992; pp. 249-256.

* cited by examiner

| Feature | Value | Positive ratings | Negative ratings |
|---|---|---|---|
| Keyword | Airplane crash | 0 | 5 |
| Keyword | Fighting | 4 | 4 |
| Keyword | India | 0 | 8 |
| Keyword | Japan | 10 | 0 |
| Keyword | Karate | 10 | 0 |
| Keyword | Martial arts | 10 | 0 |
| Keyword | Tokyo | 8 | 0 |
| Keyword | War | 2 | 0 |
| Keyword | Weapon | 0 | 5 |
| Keyword | Warfare | 0 | 5 |
| Keyword | World War II | 1 | 2 |

Fig. 3

PROFILE BASED CONTENT RETRIEVAL FOR RECOMMENDER SYSTEMS

CROSS REFERENCE TO RELATED APPLICATIONS

This application is a continuation of U.S. application Ser. No. 13/704,496 filed on Dec. 14, 2012, which is the U.S. National Stage of International Application Number PCT/EP2011/059885 filed on 15 Jun. 2011 which was published on 22 Dec. 2011 under International Publication Number WO 2011/157729, and which claims priority to European patent application 10165989.4 filed on 15 Jun. 2010, said European patent application is hereby incorporated by reference.

FIELD OF THE INVENTION

The present invention relates to an apparatus, a method, and a computer program product for controlling a recommender system for content retrieval.

BACKGROUND OF THE INVENTION

Hard-disk drives and digital video compression technologies have created the possibility of time-shifting live television (TV) and recording a large number of TV shows in high quality without having to worry about the availability of tapes or other removable storage media. At the same time, digitalization of audiovisual signals has multiplied the number of content sources for an average user. Hundreds of channels are available using a simple parabolic antenna and a TV receiver. Huge amounts of video clips are published daily on the Internet across various services, and all major content producers are already making their entire content libraries available online. As a consequence, thousands of potentially interesting programs are made available every day and can be recorded and stored locally for later access.

However, in view of this enormous amount of offered content items, individual content selection becomes an important issue. Information that does not fit to a user profile should be filtered out and the right content item that matches a user's needs and preferences (e.g. a user profile) should be selected.

Recommender systems: address these problems by estimating a like-degree of a certain content item for a certain user profile and automatically ranking the content item. This can be done by comparing a content item's characteristics (e.g. features, metadata, etc.) with a user profile or with similar profiles of other users. Thus, recommender systems can be seen as tools for filtering out unwanted content and bringing interesting content to the attention of the user.

The use of recommender technology is steadily being introduced into the market. Among various examples, websites offer a recommender to support users in finding content items (e.g. movies) they like, and electronics devices (e.g. personal video recorders) use recommender for automatic filtering of content items. Recommender systems are increasingly being applied to individualize or personalize services and products by learning a user profile, wherein machine learning techniques can be used to infer the ratings of new content items.

Recommenders are typically offered as stand-alone services or units, or as add-ons (e.g. plug-ins) to existing services or units. They increasingly appear in consumer devices, such as TV sets or video recorders. Recommenders typically require user feedback to learn a user's preferences. Implicit learning frees the user from having to explicitly rate items, and may by derived by observing user actions such as purchases, downloads, selections of items for play back or deletion, etc. Detected user actions can be interpreted by the recommender and translated into a rating. For example, a recommender may interpret a purchase action as positive rating, or in case of video items, a total viewing duration of more/less than 50% may imply a positive/negative rating.

An example of a recommender is presented in US 2008/0104127 A1. There, a media guidance system is described which is capable of recommending content items to a user based on their relevancy. For retrieving content items, the system generates search criteria first, which are derived from personalisation data that have been generated by so monitoring user behaviour and/or by receiving explicit user preferences. For instance, the search criteria can be the string: "Silvester Stalone", if the personalisation data yield that the user likes this actor. Such search criterion is sent to a media information data base for retrieving matching content items. Matching content items are rated and, if the rated items are relevant, are eventually recommended to the user.

Grossly speaking, there are two types of recommender systems, those based on a community of users and those based on metadata.

The first type is known as collaborative filtering, where either (i) members of the community are characterized by the ratings they give to items or (ii) items are characterized by the ratings they receive from the members of the community. These characterizations are next used to define similarity among users or items, respectively. For a specific member of the community and a specific item that has not yet been rated by this member, these similarities are used to infer for this member a rating for this item by combining ratings of similar users or similar items, respectively.

The second type of recommender systems uses available metadata about items, which typically cornea in the form of features and associated values or lists of values. The rating history of a user is exploited to build a profile of this user in terms of feature-value pairs, indicating for these pairs a like-degree. For a new item that has not yet been rated by this user, its metadata used, and the like-degrees of each feature-value pair present are combined to obtain an overall rating. A simple, but popular algorithm in this context is called naive Bayes, and it employs Bayesian classification.

Users of personal video recorders would like to have access to any content available, independently of its source. No matter whether the content will be broadcast (and thus listed in an electronic program guide (EPG)), or is available in a video-on-demand library or somewhere else on the Internet, users would like to have access to it and a recommender system should be able to provide recommendations for videos independently from its location or source. Independently of its type, whether it is based on collaborative filtering or is content-based, a recommender system needs to have access to all the items for which a recommendation has to be generated. For example, a recommender for a video-on-demand library needs to access all the items of the video-on-demand library to be able to calculate for each item the probability that a given user would like it, and ultimately to select a list of top rated items.

However, filtering entire databases and rating all items based on a user profile does not work for very large distributed databases, not only because it is inefficient and not scalable, but especially because it requires access to all the items of all the databases for which recommendations have to be generated.

SUMMARY OF THE INVENTION

It is an object of the present invention to provide an efficient control for recommender systems, which enables recommendations for items of remote databases without having to access all items of the database.

This object is achieved by an apparatus as claimed in claim 1, a method as claimed in claim 6, and a computer program product as claimed in claim 7.

Accordingly, the user profile normally used by the recommender to predict user ratings is employed to generate a targeted query for the content sources yielding a set of results that can be scored or rated by the recommender and provided as suggestions to the user. The feature-value pairs extracted from the user profile are used to compose a targeted query to be sent to the content sources. The results are merged and rated by the recommender to provide a list of recommended, highly relevant items. Consequently, the recommender system does not need to have complete access to entire databases or other types of content sources to produce relevant recommendations.

A feature selector is provided for selecting from the feature-value pairs extracted by the feature-value extractor those feature-value pairs which are most discriminative for said user profile. Thereby, the query can be restricted to most discriminative feature-value pairs.

The feature selector is adapted to use a Relief algorithm, e.g. the Relief algorithm described in by Kira, K., & Rendell, L. (1992): The feature selection problem: Traditional methods and a new algorithm, Proceedings of the 10th National Conference on Artificial Intelligence, San Jose, Calif., July 12-16, 129-134 or a variation thereof for selecting the most discriminative feature-value pairs. Thereby, an efficient selection procedure can be provided.

According to a second aspect, which can be combined with the above first aspect, the composing of the query and the rating of the results may be iterated until a predetermined number of relevant content items has been obtained.

According to a third aspect, which can be combined with the above first or second aspect, if there are several discriminating values associated to a single feature, then this provides the advantage that different features can be turned on and off during query composition, so that, in an iterative fashion, the resulting set of items can be controlled. This can be generalized to multiple features and the system can keep track of which values of the same or different features lead to the best results and prioritize them to improve the query composition step and reduce the number of iterations required.

According to a fourth aspect, which can be combined with any one of the above first to third aspects, the feature-value extractor may be adapted to extract feature-value pairs based on at least one of positive and negative user ratings. Thereby, queries that include and/or exclude feature values can be composed.

According to a fifth aspect, which can be combined with any one of the above first to fourth aspects, the query composer may be adapted to expand the query using a thesaurus or an ontology.

According to a sixth aspect, which can be combined with any one of the above first to fifth aspects, the query composer may be adapted to extend the query to categories other than those of the user profile. Thus, cross-domain recommendations can be provided.

According to a seventh aspect, which can be combined with any one of the above first to sixth: aspects, the user profile may have been derived from the recommender system.

According to an eighth aspect, which can be combined with any one of the above first to seventh aspects, co-occurrences of feature-value pairs may be counted and only those feature-value pairs with a sufficient co-occurrence count may be combined in the query. Thereby, the number of unsuccessful query attempts can be reduced.

It is noted that the above apparatus can be implemented as discrete hardware circuitry with discrete hardware components, as an integrated chip, as an arrangement of chip modules, or as a signal processing device or computer device or chip controlled by a software routine or program stored in a memory.

BRIEF DESCRIPTION OF THE DRAWINGS

The invention will now be described, by way of example, based on embodiments with reference to the accompanying drawings, wherein:

FIG. 3 shows a table with a feature-value excerpt of an exemplary user profile.

DESCRIPTION OF EMBODIMENTS

Embodiments of the present invention will now be described based on an exemplary recommender system which generates ratings on content items, such as books, TV programs, movies, etc.

Figure 1:
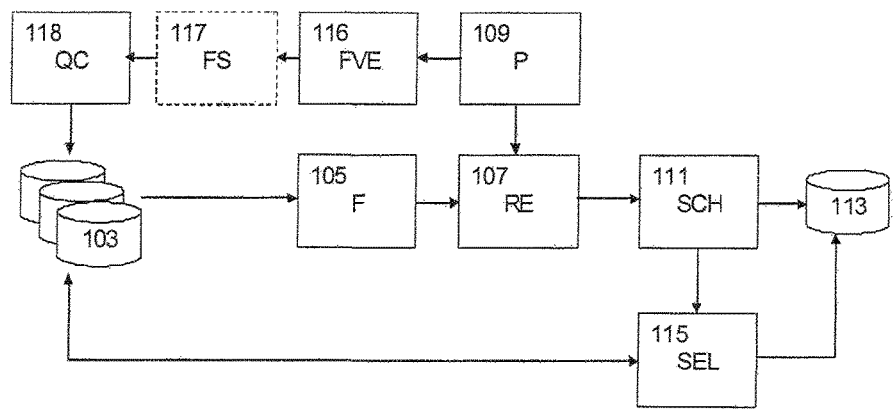
FIG. 1 shows a schematic block diagram of a recommender system according to an embodiment of the present invention.

FIG. 1 shows a schematic block diagram of a recommender system according to a first embodiment which is configured to retrieve content items from various content sources 103. The content sources 103 provide for example at least audio/video information in a broadcasting or on-demand fashion. In addition, the content sources 103 may provide information data, e.g., EPG information inside a vertical blanking interval of the video signal, or MPEG-7 metadata on segments of a particular content item (e.g. the scene boundaries of a movie). An electronic program guide (EPG) service on the Internet may for example provide information data on TV programs. Such information data retrieved from the content sources or Internet services may be supplied to at least one pre-selection filter (F) 105 which is associated with a personalized content channel and filters content items accordingly, e.g. by means of logic rules. It is noted that any number of personalized content channels could be provided. The output of the pre-selection filter 105 is connected to a recommender engine (RE) 107. Thus, each personalized content channel may have an own recommender engine 107 associated therewith. The recommender engine 107 and hence personalized content channel has a user profile (P) 109 associated therewith. The output of the recommender engine 107 is connected to a scheduler (SCH) 111. The scheduler 111 is connected to a storage device 113 (e.g. a set of hard-disk drives), and to a selector (SEL) 115. The content source 103 can be connected to the selector 115 which may comprise at least one set of content isolation means (e.g. a tuner or the like) which allows to isolate one or more content items for recording on the storage device 113. The output of the selector 115 is connected to the storage device 113.

Additionally, the first embodiment is adapted to provide recommendations for items of the content sources 103 (e.g. remote databases) without having to access all the items of the database, provided that a respective database of the content sources 103 has a query interface. The basic idea is that the user profile 109 normally used by the recommender engine 107 to predict user ratings is employed to generate a targeted query for the content sources 103 yielding a set of results that can be scored by the recommender engine 107 and provided as suggestions to the user.

For example, for a user who likes martial arts movies, the system automatically extracts from the user profile feature values that stand out, i.e., have a high like-degree. In case keywords are used as desired features, then such feature values may be "martial arts", "karate", or cast names like "Bruce Lee", or "Chuck Norris". The feature-value pairs are then used to compose a query to be sent to an entire list of the content sources 103 (e.g. video search engines and video-on-demand libraries). The results are merged and rated by the recommender engine 107 to provide a top N list of recommended relevant items.

To achieve this, the recommender system according to the first embodiment comprises a feature-value extractor or extraction function (FVE) 116 which is configured to access and analyze the user profile 109 to extract feature-value pair combinations that stand out, e.g. that have high positive or negative ratings. Optionally, an additional feature selector or selection function (FS) 117 may be provided so as to use only a top number of feature values of the set of results, which are most discriminative for a certain user profile. Here, high negative ratings may be employed as well to select feature values to be excluded in the query.

The user profile analysis performed by the feature-value extractor 116 and optional feature selector 117 is followed by a query composer or composing function 118 which receives the extracted feature-value pairs and composes a query using the given feature-value pairs obtained from the user profile analysis. The composed query is then submitted to the content sources 103.

The operation of the apparatus of FIG. 1 will now be described. Information data of a current content item to be played out on a personalized content channel is gathered from the content sources 103 or via other means, e.g., via transmission in the vertical blanking interval of an analogue TV broadcast signal or via digital video broadcast (DVB) transport streams, or combinations of any of the above. The content item may be a TV program, data stream containing video and/or audio data or a segment of a program etc.

The information data may comprise a plurality of attributes and attribute values associated with the content item such as title, actors, director and genre. Each profile 109 is based on the information data together with data indicating the "like" or "dislike" of the user. The rating of a "like" and "dislike" can be based on feedback or content items that pass the associated pre-selection filter 105. This feedback can be given as explicit rating by the users that use the particular personalized content channel. The ratings can be made in several ways. For example, the user can, using a remote control device, indicate for a currently selected content item or a given attribute of the current content item his rating ("like" or "dislike") by pressing appropriate buttons on a user interface (e.g. the remote control device) whilst bearing the current content item. Alternatively, the behaviour of the user can be observed. For example, if the user watches a current content item for more than a predefined time interval (for example, 20 minutes), this could, automatically indicate "like". In a more advanced setting, a "like" degree on a discrete or continuous scale can be provided or calculated instead of just a binary "like" or "dislike" classification.

When information data of a content item passes the filter 105, this information data is forwarded to the recommender engine 107 which calculates a biased "like" degree or rating, based on its associated user profile 109, for this subsequent content item. The information data associated to the subsequent content item is then forwarded, along with the computed rating, to the scheduler 111, which subsequently computes recording schedule that will be used to schedule the recording of content items offered by the recommender engine 107 onto the storage device 113. In particular, the scheduler 111 may primarily consider the content items of high like degree or rating while still considering sufficient new content for each personalized content channel. To this end, the recording schedule computed by the scheduler 111 is used to instruct the scheduler 115 to select the content items available from a respective one of the content sources 103 to record them on the storage device 113.

Use or user profiles can be derived using three basic methods: implicit profiling; explicit profiling; and feedback profiling. Implicit profiling methods derive content use profiles unobtrusively from the user's use histories, e.g., sets of TV shows watched and not watched. Explicit profiling methods derive content use profiles from user's answered questions as that include explicit questions about what the user likes and dislikes. Feedback profiling methods derive use profiles from content items for which a user has provided ratings of the degree of like or dislike.

Figure 2:
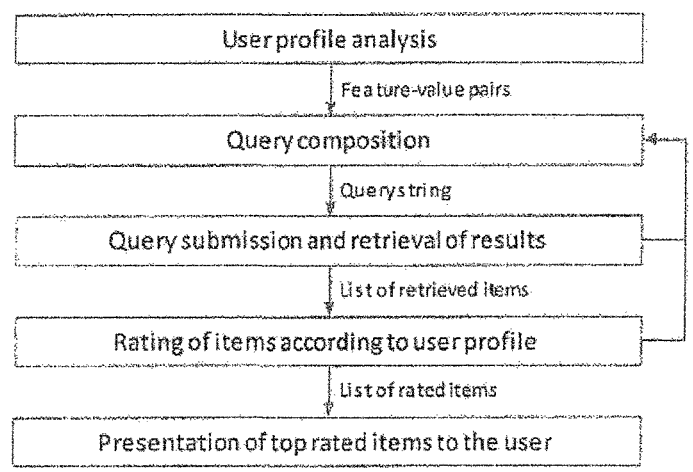
FIG. 2 shows a schematic flow diagram of a procedure for profile based content retrieval according to an embodiment of the present invention.

FIG. 2 shows a schematic flow diagram of a profile based content retrieval procedure which can be applied in the first embodiment.

The first step "user profile analysis" consists of analyzing the user profile to extract feature-value pair combinations that stand out most. These can be feature-value pairs with a high number of positive ratings when compared with other feature-value combinations, and can be achieved by the feature-value extractor 116 and optional feature selector 117 of FIG. 1.

FIG. 3 shows a table with a feature-value excerpt of an exemplary user profile for the feature 'keyword'. In FIG. 3, the keywords "Japan", "Karate", "Martial arts", and "Tokyo" stand out with respect to the rest of the keywords in terms of number of positive ratings. The use has given a positive rating to ten items having such feature values. These four feature-value pairs are passed on to the second step of FIG. 2, "query composition". In this step a query is composed using the given feature-value pairs, which can be achieved by the query composer 118 of FIG. 1. The exact form of the query depends on the search engine or database of the content sources 103 to query. For free-text search engines, the query can consist of the list, of values of the feature-value pairs. In the example above, it would be: ["Japan" "Karate" "Martial arts" "Tokyo"]. For databases or search engines that allow specifying different fields in a query, the example above could lead to the query: [keyword: "Japan" keyword:"karate" keyword:"martial arts" keyword: "Tokyo"].

In the third step the query is submitted to a set of search engines or databases that contain possibly relevant items. It is noted that different queries can be submitted to different search engines or databases of the content sources 103 to comply with different formats and application programming interfaces (APIs). The results are then retrieved and merged to form one list of related items. From this list, items that the user has already seen or has previously black-listed can be removed. The remaining items are then rated in the fourth step by the recommender engine 107 from which the first user profile 109 was derived. The result is a sorted list of related items with those items at the top that have a high probability of being liked by the user. The list of rated items is then ready to be presented to the user in the fifth step of the procedure.

The steps "query composition", "query submission and retrieval of results", and "rating of items according to user profile" may be iterated until a sufficient number of highly rated relevant items has been obtained. At each iteration, a different set of feature-value pairs could be used starting with a rich set defining a very specific query that may lead to too few results and removing feature-value pairs, thus making the query less specific, to obtain more results. In the example above, a first query ["Japan" "Karate" "Martial arts" "Tokyo"] may return 164 results on a video database, a second query, ["Japan" "Karate" "Martial arts"], without the keyword "Tokyo" may returns 1180 results, and a third query, ["Japan" "Karate"], without the keywords "Tokyo" and "Martial arts" may return 5760 results.

Alternatively, it is possible to keep track of co-occurrences of feature-values (feature values that appear in the same item) and preferably make only those combinations where the co-occurrence count is sufficiently high to reduce the number of unsuccessful query attempts.

When multiple feature-value pairs corresponding to the same feature are used, as in the examples above, where the feature-value pairs all correspond to the feature "keyword", at each iteration, the query composition can turn on and off different features. For example, one query could be generated using "keyword" feature values and another one using e.g. "cast" feature values. The system can keep track of which features lead to the best results and prioritize them to improve the query composition step and reduce the number of iterations required.

According to a second embodiment, the recommender system may be modified to use only the top N features discovered by using a feature selection procedure which may be performed at the optional feature selector 117 of FIG. 1. The top N features may be the features that are the most discriminative for a certain profile.

An example of such a feature selection procedure may be the Relief algorithm which is based on feature weighting. The diagonal elements of a projection matrix are allowed to take real-valued numbers, instead of binary ones. This enables the employment of some well-established optimization techniques and allows for efficient algorithm implementation. Among the existing feature weighting algorithms, the Relief algorithm, as described for example in K. Kira and L. A. Rendell, A practical approach to feature selection, Proc. 9th Int. Conf. Mach. Learn., (1992), pp. 249-256, is considered one of the most successful ones due to its simplicity and effectiveness. It has been recently shown that the Relief algorithm is an online algorithm that solves a convex optimization problem aimed at maximizing a margin-based objective function. The margin is defined based on the one-nearest-neighbour classifier. Compared with filter methods, the Relief algorithm usually performs better due to the performance feedback of a nonlinear classifier when searching for useful features. Compared with conventional wrapper methods, by optimizing a convex problem, the Relief algorithm avoids any exhaustive or heuristic combinatorial search, and thus can be implemented efficiently. As an extension of the first and second embodiments, also negative ratings of the user profile can be employed to create queries that exclude results with feature values corresponding to the negative ratings (e.g. ["Japan" "Karate" "Martial arts" "Tokyo" exclude:"India"]).

The query composition step performed by the query composer 118 of FIG. 1 can also include an optional "query expansion" operation that expands the query based on the given feature-value pairs using e.g. a thesaurus or an ontology. This can be employed also to prevent terminology mismatches among databases.

It is noted that the search can be extended to items of different categories than the original profile. For example, information on books can be retrieved from e.g. from an online store and suggested based on a TV viewing profile (cross-domain recommendation).

It is noted that the present invention can be applied to any recommender system for set-top boxes, TV sets, mobile phones, personal digital assistants (PDAs), personal computers (PCs), personal video recorders (PVRs), audio systems (including portable audio), Internet services (including audio and video services), and all devices where recommenders are used to collect, filter, and present content items from multiple sources to their users. The invention is thus not restricted to recommenders of television or film content, but can be applied to music, theatre shows, books and all types of products and services for which recommenders can be built.

In summary, an apparatus, a method and a computer program product for controlling a recommender system have been described, wherein a user profile normally used by a recommender to predict user ratings is employed to generate a targeted query for the remote database yielding a set of results that can be scored by the recommender and provided as suggestions to the user.

While the invention has been illustrated and described in detail in the drawings and the foregoing description, such illustration and description are to be considered illustrative or exemplary and not restrictive. The invention is not limited to the disclosed embodiments. From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. A single processor or other unit may fulfil at least the functions of FIGS. 1 and 2 based on corresponding software routines. The computer program may be stored/distributed on a suitable medium, such as an optical storage medium or a solid-state medium supplied together with or as part of other hardware, but may also be distributed in other forms, such as via the Internet or other wired or wireless telecommunication systems. The mere fact that certain measures are recited in mutually different dependent claims does not indicate that a combination of these measures cannot be used to advantage. Any reference signs in the claims should not be construed as limiting the scope thereof.

The invention claimed is:

1. An apparatus for controlling a recommender system, said apparatus comprising:
   a feature-value extractor for analyzing a user profile and for extracting feature-value pairs which characterize a user of said recommender system;
   a feature selector for selecting from said feature-value pairs extracted by said feature-value extractor those feature-value pairs which are most discriminative for said user profile,
   a query composer for composing, based on feature-value pairs extracted by said feature-value extractor and selected by said feature selector, a query to be sent to at least one content source; and
   a recommender engine for rating results obtained in response to said query so as to provide a recommendation for said user;
   wherein said feature-value selector is adapted to use a Relief algorithm as a feature selection algorithm for selecting said most discriminative feature-value pairs.

2. The apparatus according to claim 1, wherein said feature-value extractor is adapted to extract feature-value pairs based on positive user ratings.

3. The apparatus according to claim 1, wherein said query composer is adapted to expand said query using a thesaurus or an ontology.

4. The apparatus according to claim 1, wherein said query composer is adapted to extend said query to categories other than those of said user profile.

5. The apparatus according to claim 4, wherein cross-domain recommendations are provided.

6. The apparatus according to claim 1, wherein said user profile has been derived from said recommender system.

7. The apparatus according to claim 1, wherein said query composer is configured count co-occurrences of feature-value pairs, and to combine only those feature-value pairs with a sufficient co-occurrence count in the query.

8. A method of controlling a recommender system, said method comprising:
   analyzing a user profile and extracting feature-value pairs which characterize a user of said recommender system;
   selecting from said extracted feature-value pairs those feature-value pairs which are most discriminative for said user profile;
   composing based on extracted and selected feature-value pairs a query to be sent to at least one content source; and
   rating results obtained in response to said query so as to provide a recommendation for said user; wherein a Relief algorithm is used as a feature selection algorithm for selecting said most discriminative feature-value pairs.

9. The method according to claim 8, further comprising counting co-occurrences of feature-value pairs that appear in a same item and combining only those feature-value pairs with a sufficient co-occurrence count in said query.

10. The method according to claim 8, wherein said composing comprises extending said query to categories other than those of said user profile.

11. The method according to claim 10, further comprising providing cross-domain recommendations.

12. A non-transitory computer readable medium stored with code, which when executed by a processor of a computer device, causes the computer device to perform the method of claim 8.

* * * * *